United States Patent Office 3,342,684
Patented Sept. 19, 1967

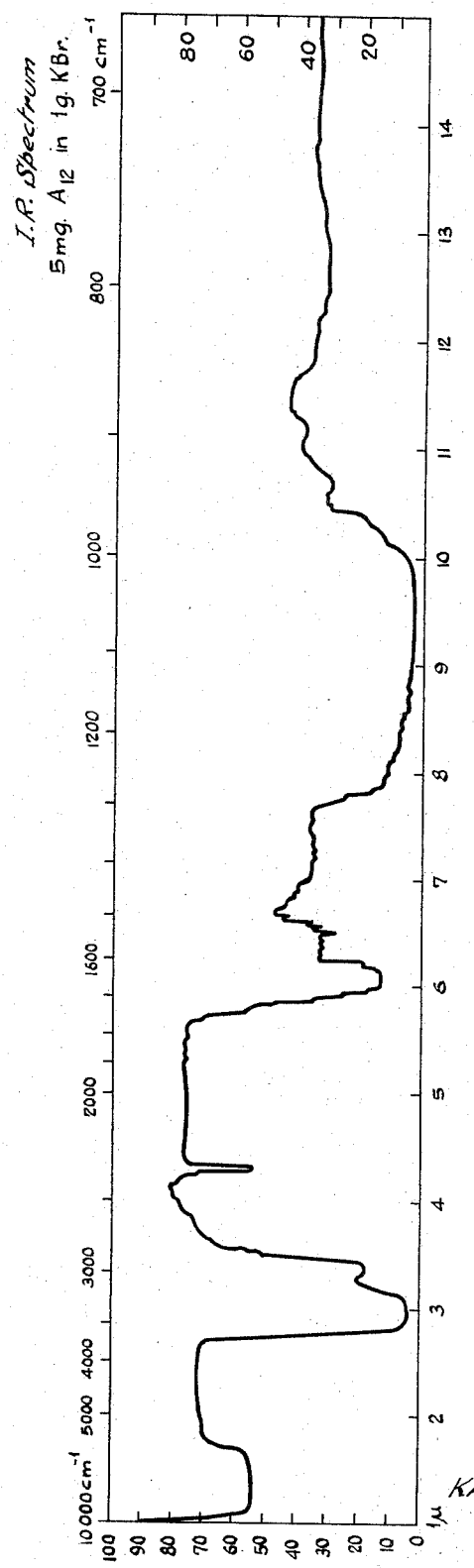

3,342,684
BRUCELLOSIS ANTIGENS
Andreas Lembke and Karl-Ernst von Milczewski, both of Sielbeck, near Eutin, Germany
Filed July 21, 1965, Ser. No. 473,664
7 Claims. (Cl. 167—78)

This application is a continuation-in-part of our copending application Ser. No. 224,860, filed Sept. 19, 1962, now abandoned.

This invention relates to antigens capable of conferring immunity against brucellosis and to improved methods of preparing the same.

The causative organisms of brucellosis are Gram-negative bacilli. The recognized species which are known to be responsible for the disease are three in number. *Brucella melitensis* was isolated by Bruce in 1886 and shown to be the causative agent in Malta fever, contracted by drinking goat's milk contaminated with these bacilli. *Brucella abortus*, characterized by Bang in 1897 is known to be responsible for contagious abortion in cattle. *Brucella suis*, identified by Traum in 1914, was isolated from aborting swine.

Control of brucellosis is a most complicated and difficult problem. The disease spreads rapidly among cattle and infects humans secondarily by direct contact through the skin or through mucous membranes of the intestinal tract. For detection of the disease and destruction of infected animals considerable reliance is placed upon agglutination tests. Briefly, agglutination is determined by mixing a series of dilutions of the test serum (obtained from an unvaccinated animal) with a standard suspension of killed Brucella organisms. The mixtures are incubated at 37° C. or 56° C. for several hours. A titre of 1:100 is strongly suggestive of Brucella infection.

Since there is no known method of chemical prophylaxis against brucellosis, vaccination of animals remains the most attractive method of control. Efforts in this direction have continued unabated during the past thirty years, the prime target of research scientists being the preparation of a relatively non-toxic agglugen-free antigen capable of conferring immunity against brucellosis. Unfortunately, almost all brucellosis vaccines known to date are characterized by one feature of disadvantage or another, each being sufficiently detrimental to remove that particular product from the category of an optimally desirable immunizing agent.

The most effective brucellosis vaccine known today, from the standpoint of low virulence and high antigenicity, is Buck-19, identified by the United States Department of Agriculture as Strain 19. It is efficacious as a preventative of abortions and premature births. However, it has not succeeded in the removal of bovine brucellosis as a serious cattle malady. So-called "persisting titres" (agglutination titres) caused by this procedure of immunization result in considerable diagnostic and epidemiological uncertainties, causing not a little difficulty in the control of infected livestock. Furthermore, newly vaccinated animals temporarily become bacteria carriers and are not distinguishable during this period from infected animals.

Ideally, in order to obtain an immunizing agent susceptible to rigid control standards and having optimal antigenicity yet lowest virulence and toxicity, the objective is to isolate from the Brucella organism a substantially pure, readily identifiable component. Moreover, the isolation of this component should be accomplished by methods which are relatively simple and may be easily duplicated by others.

Westphal et al. [2. Naturf. 7b, 148–155 (1952)] describe methods of extracting antigens from Gram-negative bacteria using phenol. One method is the so-called "warm" phenol extraction process, wherein the organism is extracted between a phenol-saturated water phase and a water-saturated phenol phase, using high concentrations of phenol, and conducting the extraction at elevated temperatures. This method has not been entirely successful, it being shown that species-specific antigens could not be obtained by this techniques. The phenol-saturated aqueous phase yields a lipopolysaccharide fraction including substantial quantities of nucleic acids (up to 50% in some cases), which fraction, moreover, is not characterized by strong antigenic power. The protein obtainable from the phenol phase exhibits some agglutinogenic activity but this is primarily attributable to residual amounts of lipid-like material combined with sugar residues.

Another method is the so-called "cold" phenol extraction process, wherein the organism is extracted with aqueous phenol under reduced temperature conditions. The thus-obtained antigens, which are extracted from the phenol-saturated aqueous phase, are of high molecular weight, have relatively high sedimentation constants (about 175–200 S), cause the formation of specific agglutinins, and are highly pyrogenic, i.e., fever-producing. For example, the pyrogenic dose observed in mice for such antigens is about 0.002 microgram/kg. They are also considerably toxic, e.g., antigen extracted according to this method from Proteus WA 68, injected intraperitoneally into mice, had an $LD_{50}$ of 5–10 mg./kg.

In general, the cold phenol extraction process comprises extracting bacterial organisms with a phenol-water mixture under reduced temperature conditions, and precipitating the antigenic fraction from the phenol-saturated aqueous phase with alcohol or acetone/alcohol. Separation of the upper aqueous layer from the lower phenolic layer after extraction is readily accomplished by centrifugation. It is often advantageous to mix the phenolic layer with an additional portion of water, again separate the two layers, and pool the second aqueous fraction with the first. For further purification, dissolved phenol and lower molecular weight components may be separated from the aqueous fractions by techniques such as dialysis against water, ultracentrifugation, adsorption (e.g., Sephadex), etc. Prior to precipitation of the antigen by addition of alcohol, the volume of the aqueous fractions is reduced to about one-third or one-half the original volume.

The concentration of phenol in the phenol-water mixture may be varied somewhat, it being necessary to keep in mind that one must ultimately obtain a 2-phase system, each phase being fully saturated with the other. For this purpose one may use equal volumes of water and phenol, the latter at a concentration from about 70% to about 95%. The preferred final concentration of phenol is about 75%. The temperature employed during extraction is preferably as low as possible without attaining crystallization. Thus, one should operate at a temperature of about 1° C. to about 5° C., preferably about 2° C. As the lower alkanol for precipitation of the antigen, ethanol is preferred, although other alcohols of low molecular weight may be employed as, for example, methanol, propanol, isopropanol or butanol. Mixtures of lower alkanols and lower alkanones, e.g., acetone, are also suitable for this purpose. Also suitable as an aid in completing the extraction, is the addition of a small amount of sodium acetate.

It has now been found that, by means of a modified cold phenol extraction process, novel antigenic components may be obtained which are substantially pure substances possessing distinguishable physical and chemical characteristics, are capable of inducing immunity from brucellosis without producing conflicting titres following administration, i.e., they are substantially non-agglutinogenic, and, further, such components are substantially non-toxic and non-pyrogenic (fever-producing dose in mice: >1.0 microgram/kg. body weight). Prior to this time, antigens extracted from bacterial organisms with phenol have lacked one or more of these characteristics. The novel antigens herein may be obtained by (1) using organisms of the genus Brucella as the source of antigen and by (2) subjecting the phenol-saturated water phase to fractional precipitation with a chilled (1–5° C.) lower alkanol, without (3) the necessity of concentrating the volume of the aqueous fractions prior to such fractional precipitation. The alkanol is added, preferably about 1–4 parts by volume, and the resulting precipitate removed. Then a second portion of alkanol, preferably about 1–4 parts by volume, is added to the supernate, yielding the novel, antigenic fraction as a precipitate. The novel immunogen of this invention is designated hereinafter by the symbol $A_{12}$. A further letter, e.g., S or Ü, is used to differentiate the immunogen as being extracted from a particular source of Brucella organism.

As the Brucella organism for the source of antigen, *Brucella abortus, Brucella melitensis* and *Brucella suis* may be advantageously employed, although *Brucella abortus* is preferred. Also includable within the scope of the present invention, and intended to be so included, are strains, variants and mutants of the above-mentioned Brucella organisms which can be subjected to our process for the purpose of yielding antigenically active components. Of particular importance in this connection are mutants. These may be obtained as a result of applied phenomena such as heat, ultraviolet radiation or, perhaps, high energy radiation. Too, mutants are obtainable by growing Brucella organisms in an environment (nutrient medium) which, because of its constitution, suppresses the growth of normal Brucella organisms while at the same time inducing the formation and promoting the growth of mutants. One such mutant is identified as the MR form of *Brucella abortus,* strain Schaedtbeck, also designated as LM 61, which yields the $A_{12}$Ü antigen according to the present invention. this mutant is obtained by culturing *Brucella abortus* derived from the infected afterbirth of a cow on albumin-agar, and has been described previously (Doctoral Dissertation, Karl-Ernst von Milczewski, University of Kiel, Germany, 1960). The mutant is readily distinguishable from known strains and forms of *Brucella abortus* by its morphological, cultural and other characteristics, which are:

(1) Resistance to fuchsine acid, thionine and pyronine; formation of urease, and color on staining procedures: similar to S-form of *Brucella abortus* Type I.

(2) Colonies of mucous-viscous consistency; diameter 2.10 mm. Edge: yellow, granular. Center: reddish yellow, strongly convex.

(3) Microscopically: smears from four days old tryptose agar culture show short rods, which tend to form chains (in contrast to cultures from S-form parent strain).

(4) Rapid and intensive formation of hydrogen sulfide.

(5) Trypaflavinagglutination: fine granular.

(6) Saline: unstable.

(7) Serologically: distinguishable from S-form of *Brucella abortus* by inagglutinability, i.e. not agglutinated by specific *abortus* Bang serum. Test animals subjected to preliminary treatment with LM 61 form no agglutinating antibodies to S-antigens but form such antibodies to the strain itself.

(8) In animal tests the strain is apathogenous.

(9) Serum rapid agglutination: negative.

For purpose of characterization, an inoculum of the mutant is introduced into tryptose agar (1.6% agar, 2% Difco-tryptose, pH 6.7) by means of the glass thread technique and the whole incubated at 37° C. for four days. The morphology of the colonies is determined by means of a twelve-power magnification binocular microscope. Trypaflavin-agglutination is done according to the method of Braun and Bonnestel [Am. J. Vet. Res., 8, 386 (1947)]. Rapid agglutination takes place with a 1:10 dilution of agglutinating Brucella antiserum. Borate buffered (0.1 M, pH 8.0) saline is used as diluent. The mixture of bacterial suspension and serum dilution is observed for agglutination on the microscope slide after 3 minutes. Agglutination with salt is carried out also (on the slide) using 0.9% saline. Using the staining technique of Hansen, the morphology of the cells is determined with the aid of the phase contract microscope under 900 magnification power.

*Brucella abortus,* strain Schaedtbeck, Form MR is obtained from a culture of *Brucella abortus,* strain Schaedtbeck, Form R after thirty days incubation at 37° C. in forced tryptose as the only dissociant. The tryptose medium has the following composition: Tryptose 1.5%, glucose 0.5%, sodium chloride 0.5%, thiamine hydrochloride 0.5 mg.%, pH adjusted to 6.7 with phosphoric acid. The MR form mutant differs from the parent R form in that the latter shows the following morphological and culture characteristics:

(1) Colonies, after 4 days in tryptose agar: small; 1.70 mm. in diameter; edge, yellow and granular; center, reddish-yellow; consistency, granular-sticking.

(2) Trypaflavinagglutination: granular.

(3) Sodium chloride: unstable.

(4) Rapid serum agglutination: negative.

(5) Hansen stain: oval cells, tend to form long chains.

The mutant differs also from *Brucella abortus,* Strain 19, S-form in that the latter has the following morphological and culture characteristics, when propagated in the medium used for the R form (above) which elucidates the MR form mutant.

(1) Colonies after 4 days in tryptose agar: small; 1.4–1.6 mm. in diameter; edge, greenish-blue; center, faintly reddish-yellow; consistency, buttery deliquescent.

(2) Sodium chloride: stable.

(3) Trypaflavinagglutination: negative.

(4) Rapid serum agglutination: rapid positive.

(5) Hansen stain: cells morphologically uniform, round, individual or in short chains.

It will be understood therefore, by way of recapitulation, that the present invention includes within its intended scope, methods for producing antigens from various species of Brucella, as well as their known strains, variants, and mutants. It embraces also the useful antigens obtained by these methods, with particular attention focused on hitherto unobtained antigenic components which have especially desirable utility as immunizing agents against brucellosis. Such antigens fall within the scope of the invention and will be more fully described hereinafter.

There is no valid basis for correlation between the titre of agglutinins and the degree of acquired immunity in immunization against brucellosis. In our hands, agglutinogenic characteristics of brucellosis vaccines are not identical with immunizing characteristics. Therefore, we believe that animals may be immunized against brucellosis without simultaneous formation of agglutinins. In fact, agglutinin formation may be regarded as an avoidable and undesired side reaction. This is so because (1) agglutinogenic and immunizing antigens are distinct from each other, or (2) both the agglutinogenic and immunizing antigens are combined on one and the same complex-antigen-molecule but represent different determinative groupings. This problem is dealt with by means of preparation of purified antigens directed toward separation of agglutinogens and immunogens. Thus, the object is to separate a purified immunizing antigen from *Brucella abortus* which is substantially non-agglutinogenic and non-toxic and which can be used as a prophylactic against the disease.

EXTRACTION AND ISOLATION OF ANTIGEN $A_1$

A virulent strain of *Brucella abortus*, strain Schaedtbeck, S-form, is used for preparation of antigens. The bacteria are cultivated for a period of 48 hours on a liver-extract agar prepared in the following manner: One kilogram of liver is skinned and cut to pieces. One liter of water is added and the mixture heated for 2 hours in a steam pot. The supernate is decanted and sterilized by being heated in a steam pot on each of three successive days. Forty-five g. of "Merck-Standard-I-agar" are added to each 150 ml. of the broth thus obtained. Enough water is added to yield 1 liter of final product.

The cells grown on the liver-agar described above are washed off with a phenol-saline solution (0.5% phenol, 0.85% sodium chloride) and sedimented by centrifugation. The cells are washed twice with physiological saline, resuspended and filtered through a G2-filter (G2-Fritte) in order to remove coarse particles from the bacterial cell suspension. The suspension is poured into acetone, the cells are sedimented by centrifugation and dried under reduced pressure after being washed several times with acetone.

Two to three grams of acetone-dried bacteria are suspended in 80 ml. distilled water and chilled to a temperature of $+2°$ C. To this suspension are added 130 ml. of a 75% mixture of phenol/water (100 g. phenol $+32$ ml. water) previously chilled to $+3°$ C. The mixture is thoroughly shaken and kept in the cold for a period of 20 to 30 minutes accompanied by occasional shaking. The phenol/water suspension is disforced now by centrifugation. The supernate water phase is decanted. Approximately 60 ml. of water are added to the remaining phenolic layer and sediment which are centrifuged after being thoroughly shaken. Both water layers are pooled. This is fraction A.

The water phase of the phenol extraction (fraction A) is dialyzed for a period of three days against tap water and for one day against distilled water. The volume of A is reduced to 30 to 40 ml. by vacuum distillation at approximately $30°$ C. The solution thus obtained shows weak opalescence. The solution is subjected to high-speed centrifugation. Enough chilled ethanol is added to the supernate to yield a final concentration of 70% ethyl alcohol. A substance precipitates which hereinafter is identified as fraction $A_1$ (Antigen $A_1$). This fraction is sedimented by centrifugation, washed with ethyl alcohol, acetone and ether, and dried under reduced pressure to give a yield in an amount equivalent to about 2% yield of dried bacterial matter.

CHARACTERIZATION OF ANTIGEN $A_1$

Antigen $A_1$ is a greyish-brown powder with relatively good solubility in water. It responds to reactions listed below as indicated:

Molisch reaction for carbohydrates _____ +
Xanthroprotein reaction for amino acids containing aromatic structures _____ +
Biuret reaction for proteins and polypeptides _____ +

By ultracentrifugation Antigen $A_1$ shows even distribution with an accurate gradient. Spectral analysis in the range of ultraviolet light shows lack of absorption bands at 260 m$\mu$ which are characteristic for nucleic acids. Thus the substance is free from nucleic acids and may be regarded as being relatively pure glycolipoprotein. Hydrolysis of measured amounts with N-HCl at $100°$ C. for a period of one hour, followed by removal of the protein by means of 10% meta-phosphoric acid, affords a means of estimating the sugar content of the samples in the supernate by the anthrone-sulfuric acid method. Estimation based upon a standard curve measured with pure glucose gives a polysaccharide content of 21.5–24.8% "glucose units." Fifty mg. of Antigen $A_1$ are kept for four hours in 25 ml. of N-sulfuric acid at $100°$ C.

The hydrolyzed material is neutralized with barium hydroxide to precipitate the sulfuric acid and the phosphorylated sugar. The neutralized hydrolysate is subjected to centrifugation, the volume of the supernate reduced to about 2% of that of the starting material and used for chromatographical separation. The following sugar residues are identified: galactose, glucose, mannose, xylose, amino sugars (demonstrated with Elson-Morgan-reagent).

The presence of lipid components in Antigen $A_1$ is determined by staining with Sudan black. The test is conducted as follows: The antigen is suspended in 0.5% di-sodium phosphate solution in an amount to yield 1% solution of the antigen. Aliquots of the suspension, corresponding to 20, 50 and 100$\gamma$ of the test compound, are applied to filter strips. A series of spots are obtained. The filter strips are soaked for three hours in an ethanol solution of Sudan black (a hot solution containing 60% ethanol, saturated with Sudan black B and filtered). After staining, the filter strips are washed twice for fifteen minutes each in 50% ethanol. The occurrence of grey-black or brown-black colorizations of the spots indicates the presence of lipids. According to this test, Antigen $A_1$ gives a $+++$ reaction.

IMMUNOGENIC PROPERTIES OF ANTIGEN $A_1$

Antigen $A_1$ is tested in comparison with acetone-dried Brucellae for its ability to reinforce an existing immunity against *Brucella abortus*. To produce the primary immunity CFW-mice are injected once only with an effective depot vaccine (concentration: $2.5 \times 10^9$ killed *Brucella abortus*, MR-form, adsorbed on 10 mg. $Al_2O_3$ suspended in 1 cc. distilled water). The second injection is then made with the solution or suspension of Antigen $A_1$ or the acetone-dried Brucellae in physiological saline solution. For both antigens to be tested and the comparative injection with acetone-dried Brucellae a test series of 60 animals is used; for each series test groups consisting of 15 animals each are simultaneously treated according to the following scheme, the Greek letter "gamma," represented by the symbol "$\gamma$," signifying herein "microgram(s)."

Test Group I: First vaccination with 0.05 cc. of depot vaccine per mouse intracutaneously: ten days later a second vaccination with 20$\gamma$ of the antigen to be tested intraperitoneally in 0.2 cc. of fluid.

Test Group II: First vaccination as for Group I. Ten days later a second vaccination with 10$\gamma$ of the antigen to be tested intraperitoneally in 0.1 cc. of fluid.

Test Group III: First vaccination as for Group I. Ten days later vaccination with 5$\gamma$ of the antigen to be tested intraperitoneally in 0.05 cc. of fluid.

Test Group IV: First vaccination as for Group I. No further vaccination.

Twenty-two days after the first vaccination viz. 12 days after the second vaccination the test animals in each series are experimentally infected. For the infection a sixty-hour old tryptose agar culture of *Brucella abortus*, S-form, Schaedtbeck strain, is used.

Five mice receive $2.5 \times 10^5$ microorganisms per mouse, a further 5 mice receive $5 \times 10^5$ microorganisms per mouse and finally 5 mice receive $1 \times 10^6$ microorganisms per mouse, intravenously in each case. Four days after the experimentally induced infection all test animals are killed, their spleens extirpated and smeared on agar dishes to reisolate the microorganisms. The number of successfully infected animals and the number of reisolated microorganisms per spleen are determined and classified according to the dates of inoculation and test infection. As criterion the average logarithm of the number of reisolated microorganisms per spleen for each test infection dose and each vaccination dose is established. This number, the "degree of infection" is given in the corresponding table besides the number of fully protected animals (=no reisolation of *Brucella abortus* from the spleen). See data, Tables I through III.

TABLE I

| | Test Group | | | | | | | | | | | |
|---|---|---|---|---|---|---|---|---|---|---|---|---|
| | I | | | II | | | III | | | IV | | |
| Antigen dose | 20γ/mouse | | | 10γ/mouse | | | γ/mouse | | | 0γ/mouse | | |
| Test infection dose (Br. per mouse) | $2.5 \times 10^5$ | $5 \times 10^5$ | $1 \times 10^6$ | $2.5 \times 10^5$ | $5 \times 10^5$ | $1 \times 10^6$ | $2.5 \times 10^5$ | $5 \times 10^5$ | $1 \times 10^6$ | $2.5 \times 10^5$ | $5 \times 10^5$ | $1 \times 10^6$ |
| No. of animals tested | 5 | 5 | 5 | 5 | 5 | 5 | 5 | 5 | 5 | 5 | 5 | 5 |
| No. of animals protected | 3 | 2 | 1 | 0 | 2 | 2 | 3 | 0 | 0 | 0 | 0 | 0 |
| Percentage of animals protected | 60 | 40 | 20 | 0 | 40 | 40 | 60 | 0 | 0 | 0 | 0 | 0 |
| Degree of infection: Log of reisolation per spleen | 0.99 | 1.87 | 2.13 | 1.66 | 1.68 | 2.04 | 0.96 | 2.36 | 2.17 | 3.20 | 3.31 | 3.28 |
| No. of animals tested | 15 | | | 15 | | | 15 | | | 15 | | |
| No. of animals protected | 6=40% | | | 4=26.7% | | | 3=20% | | | 0=0% | | |

Total No. of protected animals after vaccination with acetone-dried Br.=13 out of 45 or 28.9%.

TABLE II

| | Test Group | | | | | | | | | | | |
|---|---|---|---|---|---|---|---|---|---|---|---|---|
| | I | | | II | | | III | | | IV | | |
| Antigen dose | 20γ/mouse | | | 10γ/mouse | | | 5γ/mouse | | | 0γ/mouse | | |
| Test infection dose (Br. per mouse) | $2.5 \times 10^5$ | $5 \times 10^5$ | $1 \times 10^6$ | $2.5 \times 10^5$ | $5 \times 10^5$ | $1 \times 10^6$ | $2.5 \times 10^5$ | $5 \times 10^5$ | $1 \times 10^6$ | $2.5 \times 10^5$ | $5 \times 10^5$ | $1 \times 10^6$ |
| No. of animals tested | 5 | 5 | 5 | 5 | 5 | 5 | 5 | 5 | 5 | 5 | 5 | 5 |
| No. of animals protected | 5 | 2 | 3 | 4 | 4 | 3 | 3 | 0 | 2 | 1 | 0 | 0 |
| Percentage of animals protected | 100 | 40 | 60 | 80 | 80 | 60 | 60 | 0 | 40 | 20 | 0 | 0 |
| Degree of infection: Log of reisolation per spleen | 0 | 1.72 | 0.78 | 0.51 | 0.47 | 1.32 | 0.74 | 1.58 | 0.83 | 1.26 | 2.79 | 2.7 |
| No. of animals tested | 15 | | | 15 | | | 15 | | | 15 | | |
| No. of animals protected | 10=66.7% | | | 11=73.5% | | | 5=33.3% | | | 1=6.7% | | |

Total No. of protected animals after vaccination with Antigen $A_1$=26 out of 45 or 57.8%.

TABLE III

| Antigen Fraction | *Br. abortus* | $A_1$ |
|---|---|---|
| With test infection dose of $2.5 \times 10^5$ Br., fully protected animals. | (6/15)[1] 40% | (12/15) 80%. |
| Degree of infection (log of reisolation per spleen). | 1.20±0.31[2] | 0.41±0.24. |
| With test infection dose of $5 \times 10^5$ Br., fully protected animals. | (4/15) 27% | (6/15) 40%. |
| Degree of infection (log of reisolation per spleen). | 1.91±0.37 | 1.25±0.32. |
| With test infection dose of $1 \times 10^6$ Br., fully protected animals. | (3/15) 20% | (8/15) 53%. |
| Degree of infection (log of reisolation per spleen). | 2.12±0.38 | 0.95±0.33. |
| Overall sum for all test infection doses, percent of animals protected. | (13/45) 28.8% | (26/45) 57.8%. |

[1] No. of animals protected/No. of animals tested.
[2] Standard deviation.

This shows that Antigen $A_1$ in doses of 20, 10 and 5 micrograms can reinforce an existing immunity. Vaccination with $A_1$ confers complete protection on a number of test animals against a test infection with $2.5 \times 10^5$, $5 \times 10^5$, and $1 \times 10^6$ Brucellae. The total number of animals protected against all vaccination doses and test infection doses is 26 out of 45, i.e., almost 58%.

In contrast to this, the total number of animals protected against all vaccination doses and test infection doses by the use of acetone-dried Brucellae as immunogenic agent is 13 out of 45, i.e., about 29%.

EXTRACTION AND ISOLATION OF ANTIGEN $A_{12}S$ 21 grams of acetone-dried bacteria (*Brucella abortus*, strain Schaedtbeck, S-form) are suspended in 320 cc. of distilled water and cooled to 2° C. To this suspension is added a mixture of 400 g. of phenol and 130 cc. of water, cooled to 2° C. Further working up is carried out as described for Antigen $A_1$ (above), except that, after dialysis, the pooled phenol-saturated aqueous layers are not subjected to evaporation in order to decrease the volume. Instead, the resulting aqueous solution is treated with 2 parts by volume of chilled ethanol and 1% by volume of a saturated ethanolic sodium acetate solution and the resulting precipitated sediment is centrifuged off. A further 2 parts by volume of chilled ethanol and 1% by volume of the sodium acetate solution is then added to the supernate and the precipitating antigen, $A_{12}S$, is harvested by centrifugation. The antigen may then by dried, for example, in a vacuum exsiccator. The yield of fraction $A_{12}S$ thus obtained amounts to about 2.5% (based on the weight of dried bacterial starting material). The presence of sodium acetate is not critical in the extraction of $A_{12}$ and may be eliminated.

EXTRACTION AND ISOLATION OF ANTIGEN $A_{12}Ü$

Dried cells of *Brucella abortus*, strain Schaedtbeck, MR-form, are used as the bacterial starting material. To prepare the dried cells, a virulent strain of the bacteria are cultivated as usual on liver-broth-Standard-I-agar, incubation being for 6–7 days at 37° C. Then the bacterial cells are washed off from the agar surface with 0.35% saline and filtered through a G-1-Fritte filter in order to remove coarse particles from the bacterial cell suspension. Four parts by volume of chilled ethanol (2–4° C.) and 10 ml./liter of a saturated ethanolic sodium acetate solution are added to the suspension. The suspension is allowed to stand in the cold until precipitation is complete. The cells are sedimented by centrifugation and dried under reduced pressure.

21 grams of dried bacteria are suspended in 320 cc. of distilled water and cooled to 2° C. To this suspension is added a mixture of 400 g. of phenol and 130 cc. of water, cooled to 2° C. The mixture is shaken and maintained in the cold for about 30 mins. with occasional shaking. The phenol-saturated water layer is separated after centrifugation. The water-saturated phenolic layer is then mixed with an additional 300 cc. of water. The mixture is then centrifuged and the aqueous layer separated and pooled with the previously collected water layer. Centrifugations are preferably conducted under cold conditions. The pooled phenol-saturated water layers are subjected to dialysis against distilled water for 10 days, and then mixed with 1 part by volume of chilled ethanol and 1% by volume of a saturated ethanolic sodium acetate solution. The mixture is allowed to stand at cooled temperatures (1–5° C.) and the resulting precipitate is removed. An additional 3 parts by volume of chilled ethanol and 1% by volume of the sodium acetate solution is added. On standing in the cold, a precipitate ($A_{12}Ü$) forms which is collected, e.g., by slow speed centrifugation (3500 r.p.m.) and dried under reduced air pressure (yield: 6–7%).

CHARACTERIZATION OF ANTIGEN $A_{12}S$

Antigen $A_{12}S$ is a glycolipoprotein substantially free of nucleic acids (about 1% content) which responds to the reactions given below as indicated in the following table:

|  | $A_{12}S$ |
|---|---|
| Solubility in water | >1 g. 100 ml. |
| Nucleic acid content | ~1.1%. |
| Lipid content (Sudan black method) | ++++. |
| Sugar content ("glucose units") | 43–46%. |
| Galactose | About 10%. |
| Glucose | About 2%. |
| Mannose | About 1.5%. |
| Xylose | About 1%. |
| Aminosugars (demonstrated with Elson-Morgan reagent) | +. |
| Molisch reaction for carbohydrates | ++. |
| Xanthoprotein reaction for amino acids containing aromatic structures | ++. |
| Biuret reaction for proteins and polypeptides | +. |

In order to determine the nucleic acid content, spectrophotometric measurements are taken of a 0.1% or a 0.01% solution of the antigen in filled quartz containers 1 cm. in depth ($E°_{260} - E°_{290} = E°$ nucleic acid). The concentration of nucleic acid is determined by comparison with adenosin-triphosphate standard curves.

For the qualitative determination of the sugar residues, 40 mg. of the antigen is dissolved in 2 ml. of 1 M $H_2SO_4$ and hydrolyzed in a sealed ampule for 4 hrs. at 100° C., with occasional shaking. The hydrolysate thus obtained is diluted with an equal volume of water and the pH adjusted to 7.0 (neutral) with 1 M barium hydroxide. After 50 minutes, the sample is centrifuged. The supernate is siphoned off and its volume reduced to about 0.9 ml. by vacuum evaporation. Then an equal volume of acetone is added. The hydrolysate thus obtained is ready for chromatographic study. Separation of the sugar components are achieved by descending paper chromatography. The following materials are suitable for this purpose:

Paper: Schleicher-Schüll, 2043b Mgl
Solvent:
  I. n-Butanol-acetone-water (5:5:1)
  II. n-Butanol-pyridine-water (6:4:3)
Developed with:
  (a) Aniline-phthalate (for aldehyde sugars)
  (b) 4-dimethylamino-benzaldehyde (for amino sugars)
  (c) Naphthol-resorcinol-trichloroacetic acid (for ketonic sugars)

The running times are generally 17–20 hrs. The solvent "butanol-acetone-water" serves for tests on the content of ketonic sugars as well as for a better separation of the pentoses. On the other hand, a better separation of the aldehyde sugars is achieved by the solvent "butanol-pyridine-water." The latter also yields better results in the separation of the desoxy-sugars.

Approximations of the quantitative sugar contents are obtained by comparison of certain known amounts of reference sugars which are simultaneously subjected to chromatography. Obviously, only those sugar residues of the antigenic glycolipoprotein are determined by this procedure which are completely cleaved to monosaccharides. However, a conception of the quantitative relations is obtained.

During the chromatographic determination, an unidentifiable component which is chromatographically fast running is also observed.

The following table records the data obtained on elemental analyses of Antigen $A_{12}S$ (two extractions):

|  | $A_{12}S$, percent | $A_{12}S$, percent |
|---|---|---|
| C | 30.62–30.97 | 32.40–32.54 |
| H | 5.40–5.42 | 5.14–5.16 |
| N | 2.11–2.25 | 2.44–2.48 |
| P | 1.90–1.96 | 1.78–1.83 |
| Na | 5.87–5.98 | 5.97–6.03 |
| $H_2O$ |  | 2.70–2.78 |
| Volatiles |  | 5.74–5.74 |

The measured optical rotation of Antigen $A_{12}S$ (1.14% in distilled water) is $[\alpha]_{20}^{D} = +12°$ ($\pm 1.2°$).

Ultraviolet light spectrum analysis shows only a weak maximum of absorption at 258 m$\mu$; and in the infrared region (see figure), no characteristic sharp bands are observed (5 mg. $A_{12}$ in 1 g. KBr).

At 50,000 r.p.m., the sedimentation constant of a 1% solution in 1/15 M phosphate (pH 7.0) is: $s_{20} = 1.4–1.5S$ (Swendberg units). The preparation is monodisperse over a life of 4 hours and exhibits a single very sharp gradient.

CHARACTERIZATION OF ANTIGEN $A_{12}Ü$

Antigen $A_{12}Ü$ is a glycolipoprotein substantially free of nucleic acids (about 1% content) which responds to the reactions given below as indicated in the following table:

|  | $A_{12}Ü$ |
|---|---|
| Solubility in water | >1 g./100 ml. |
| Nucleic acid content | [1] ~1.1%. |
| Lipid content (Sudan black method) | ++++. |
| Sugar content ("glucose units") | [2] 41–46%. |
| Galactose | About 10%. |
| Glucose | About 2%. |
| Mannose | About 1.5%. |
| Xylose | About 1%. |
| Amino sugars (demonstrated with Elson-Morgan-reagent) | +. |
| Molisch reaction for carbohydrates | ++. |
| Xanthoprotein reaction for amino acids containing aromatic structures | ++. |
| Biuret reaction for proteins and polypeptides | +. |

[1] Average of four extractions: 0.86%, 1.6%, 1.0% and 0.98%.
[2] Minimum and maximum of four determinations: 45–46%, 43–44%, 44–45%, 41–42%.

During the chromatographic determinations for sugars, an unidentifiable component which is chromatographically fast running is also observed as in the case of Antigen $A_{12}S$. The optical rotation, sedimentation constant, and U.V. and I.R. spectrums for $A_{12}Ü$ are the same as those for $A_{12}S$.

Elemental analysis of Antigen $A_{12}Ü$ reveals the following data:

|  | Percent |
|---|---|
| C | 34.19–34.24 |
| H | 5.38–5.45 |
| N | 3.96–4.02 |
| P | 1.04–1.05 |
| Na | 4.77–4.82 |
| $H_2O$ | 3.10–3.19 |
| Volatiles | 6.32–6.35 |

IMMUNOGENIC PROPERTIES OF ANTIGEN $A_{12}S$

Antigen $A_{12}S$ is tested on CFW-mice for its immunizing power. In contrast to the test with Antigen $A_1$, the immediate immunizing action of $A_{12}S$ is tested without previous vaccination with depot vaccine. For this purpose 40 test animals from each test group are simultaneously treated according to the following scheme:

Test Group I: First vaccination with 20γ of $A_{12}S$ per mouse intracutaneously in 0.05 cc. of fluid. Ten days later second vaccination with the same dose intracutaneously.

Test Group II: First vaccination with 2γ of $A_{12}S$ per mouse intracutaneously in 0.05 cc. of fluid. Ten days later second vaccination with the same dose intracutaneously.

Test Group III: No vaccination.

Twenty-four days after the first vaccination, viz. 14 days after the second vaccination the test animals from each test group are experimentally infected. For this infection a forty-eight-hour old tryptose agar culture of *Brucella abortus*, S-form, Schaedtbeck strain, is used. Ten mice from each test group receive $5\times10^4$ microorganisms per mouse, a further 10 mice receive $1\times10^5$ microorganisms per mouse, 10 mice receive $2\times10^5$ microorganisms per mouse and finally 10 mice receive $5\times10^5$ microorganisms per mouse, all intravenously.

Four days after the test infection all test animals are killed, their spleens extirpated and tests conducted as described for Antigen $A_1$. See Table IV.

TABLE IV

| | Test Group | | |
|---|---|---|---|
| | I | II | III |
| Antigen dose | 20 γ/mouse | 2 γ/mouse | 0 γ/mouse |
| With test infection dose of $5\times10^4$ Br., fully protected animals | 50% (5/10) | 100% (10/10) | 60% (6/10). |
| With test infection dose of $1\times10^5$ Br., fully protected animals | 90% (9/10) | 100% (10/10) | 40% (4/10). |
| With test infection dose of $2\times10^5$ Br., fully protected animals | 90% (9/10) | 90% (9/10) | 20% (2/10). |
| With test infection dose of $5\times10^5$ Br., fully protected animals | 0% (0/10) | 20% (2/10) | 0% (0/10). |
| Total No. of animals protected against all test infection doses | 57% (23/40) | 77% (31/40) | 30% (12/40). |

Table IV clearly shows that Antigen $A_{12}S$ has an active immunizing effect. 2γ were more effective than 20γ of $A_{12}S$.

COMPARATIVE IMMUNOGENIC PROPERTIES OF $A_{12}S$ AND $A_{12}Ü$

The table immediately below summarizes the results of an experiment performed on genetically pure CFW-mice which had been pretreated once with a dose of the glyco-lipid-protein antigens $A_{12}S$ and $A_{12}Ü$. The animals are challenged by intraperitoneal injections of $5\times10^4$ virulent brucellae (*Brucella abortus*-S) injections being made on the 21st day of the experiment. All animals are killed on the 28th day; the spleens are removed and homogenized under aseptical conditions. Then streaks are prepared from this material on tryptose agarplates. Evaluation is done after 4 days of incubation at 37° C. As may be gathered from the table, optimal activity is observed after pretreatment with about 0.1–1.0 gamma/kg., although advantageous results are obtained with 0.01–50.0 gamma/kg.

| Immunization, Dose (γ/kg.) | Number of mice | No. of Positive Spleens After 28 Days | |
|---|---|---|---|
| | | $A_{12}Ü$ | $A_{12}S$ |
| 0 (control | 20/20 | 18/20 | 20/20 |
| 0.001 | 20/20 | 14/20 | 17/20 |
| 0.01 | 20/20 | 5/20 | 5/20 |
| 0.1 | 20/20 | 1/20 | 3/20 |
| 1.0 | 20/20 | 3/20 | 3/20 |
| 5.0 | 20/20 | 4/20 | 7/20 |
| 50.0 | 20/20 | 7/20 | 9/20 |

In determining whether the rate of infection may be influenced by simultaneous application of the immunogen ($A_{12}Ü$ in this instance) and of virulent *Brucella abortus*-S ($5\times10^4$ i.p.) to CFW-mice, the data below is observed. Appreciable protection is recorded for dosages of 0.01–5.0 gamma/kg. body weight, although advantageous results are observed up to 50 gamma/kg.

| Dose of $A_{12}Ü$ (γ/kg.) | No. of Positive Spleens After— | | | |
|---|---|---|---|---|
| | 7 days | 14 days | 21 days | 28 days |
| Control | 18/20 | 20/20 | 18/20 | 17/20 |
| 0.001 | 18/20 | 18/20 | 15/20 | 15/20 |
| 0.01 | 7/20 | 2/20 | 0/20 | 0/20 |
| 0.1 | 3/20 | 0/20 | 0/20 | 0/20 |
| 1.0 | 0/20 | 0/20 | 0/20 | 0/20 |
| 5.0 | 6/20 | 1/20 | 0/20 | 0/20 |
| 50.0 | 9/20 | 3/20 | 1/20 | 2/20 |

COMPARATIVE AGGLUTINATION TITERS

The agglutinogenic action of Antigen $A_{12}S$ is tested on rabbits, agglutination titers being determined after one dose of antigen. Rabbits of the same litter, being 10 weeks of age and having a weight of 2 kg., serve as the experimental animals. One rabbit is used for each dose of antigen tested. The antigens are dissolved in sterile physiological saline and then injected into the marginal ear vein of the experimental animals. Blood letting, preparation of serum, and determination of the agglutination titer are done in the usual manner. The results of the experiment are tabulated below. For the sake of comparison, this table also contains values determined with acetone-dried *Br. abortus* S and with Antigen $A_1$.

| | Dose, γ/kg. | Agglutination Titer (days after injection of antigen) | | | |
|---|---|---|---|---|---|
| | | 6 days | 7 days | 10 days | 11 days |
| $A_{12}S$ | 50 | ---------- | 1:50 | ---------- | ---------- |
| | 25 | ---------- | 1:50 | ---------- | 0 |
| | 10 | ---------- | 0 | ---------- | 0 |
| | 5 | ---------- | 0 | ---------- | 0 |
| Acetone-dried *Br. abortus*-S | 40 | 1:320 | ---------- | 1:320 | ---------- |
| | 100 | 1:1,280 | ---------- | 1:1,280 | ---------- |
| $A_1$ | 10 | 1:80 | ---------- | 1:160 | ---------- |
| | 50 | 1:1,280 | ---------- | 1:1,280 | ---------- |

Administration of $\leq 10\gamma$ of $A_{12}S$ per kg. of rabbit does not lead to the formation of agglutinins. A slight and fast disappearing agglutinin formation is observed when $25\gamma$ of $A_{12}S$/kg. is administered. An injection of $50\gamma$ of $A_{12}S$/kg. results in a titer of only 1:50 on the 7th day. On the other hand, $50\gamma$ of $A_1$/kg. results in an agglutination titer of 1:1280 on the 6th day. Injection of $40\gamma$ of acetone-dried Brucella per kg. results in a titer of 1:320. According to these experimental results, Antigen $A_{12}S$ exhibits a much less pronounced agglutinogenic action than either $A_1$ or acetone-dried Brucella. Similar results are obtained for Antigen $A_{12}\ddot{U}$ as for $A_{12}S$. This indicates that the glyco-lipid-protein $A_{12}$ is extensively freed from agglutinogenic components.

In another experiment, rabbits are intravenously injected with 5 to 80 micrograms of $A_{12}S$ per rabbit as shown in the table below and agglutination titers are compared with those obtained from acetone-dried *Brucella abortus*-S cells. The test animals are 4 months of age and belong to the strain "Vienna Whites." Second intravenous injections are made 3 weeks after the first vaccination with 5 micrograms of the same antigen per animal. In order to determine agglutination titers, blood is drawn from the marginal ear vein of the animals at the following intervals: 14 days after the first vaccination, and 2 and 3 weeks after the second vaccination.

| Animal wgt. (g.) | Antigen | 1st vacc. dose | Agglutination Titer | | |
|---|---|---|---|---|---|
| | | | 2 weeks after 1st vacc. | 2 weeks after 2d vacc.[1] | 3 weeks after 2d vacc.[1] |
| 2,850 | $A_{12}S$ | 5 | 1:25 | 1:10 | 1:10. |
| 2,765 | $A_{12}S$ | 10 | 1:25 | 1:10 | 1:10. |
| 2,735 | $A_{12}S$ | 20 | 1:25 | 1:10 | 1:10. |
| 2,735 | $A_{12}S$ | 40 | 1:25 | 1:10 | 1:10. |
| 2,500 | $A_{12}S$ | 80 | 1:25 | 1:10 | 1:10. |
| 3,075 | Dried *Br. abortus* S | 20 | 1:400 | 1:640 | 1:640/1,280. |
| 3,175 | do | 40 | 1:400/800 | 1:320/640 | 1:320/640. |
| 3,170 | do | 80 | 1:1,600 | 1:640 | 1:320. |

[1] A uniform dose of 5 micrograms of the respective antigen is given on 2d vaccination to each of the test animals; i.v. application.

As may be gathered from the recorded data, a single injection of $A_{12}$ in amounts of 5 to $80\gamma$ per rabbit does not result in formation of significant agglutination titers. In contrast, a single injection of corresponding doses of dried *Br. abortus* S results in agglutination titers of up to 1:1600. Further, insignificant agglutination titers are demonstrated in the sera of rabbits receiving a second vaccination ($5\gamma$) of $A_{12}S$ 3 weeks after the first vaccination.

TOXICITY OF ANTIGENS $A_1$, $A_{12}S$ and $A_{12}\ddot{U}$

The toxicity of antigens $A_1$, $A_{12}S$ and $A_{12}\ddot{U}$ is illustrated by the data below. Each antigen is dissolved in sterile physiological saline and the concentration adjusted so that the injecting quantity of 0.5 ml. contains the dosage (mg./kg. body weight) indicated. Injections are made intraperitoneally into CFW-mice being 6–8 weeks of age.

| | Dose (mg./kg.) | No. of Animals | No. of Dead Animals at— | | | |
|---|---|---|---|---|---|---|
| | | | 24 hrs. | 48 hrs. | 72 hrs. | 96 hrs. |
| $A_1$ | 200 | 4 | 3 | 4 | 4 | 4 |
| | 150 | 5 | 1 | 1 | 1 | 1 |
| | 112.5 | 4 | 0 | 0 | 0 | 0 |
| $A_{12}S$ | 200 | 5 | 0 | 0 | 0 | 0 |
| | 150 | 5 | 0 | 0 | 0 | 0 |
| | 112.5 | 5 | 0 | 0 | 0 | 0 |
| $A_{12}\ddot{U}$ | 200 | 5 | 0 | 0 | 0 | 0 |
| | 100 | 5 | 0 | 0 | 0 | 0 |
| | 50 | 5 | 0 | 0 | 0 | 0 |

The data illustrate the lack of toxicity for antigens $A_{12}S$ and $A_{12}\ddot{U}$ as compared with antigen $A_1$. The $LD_{50}$'s of the former are in excess of 200 mg./kg.

In summary, it may be stated that Antigen $A_1$ and Antigen $A_{12}$ possess strong immunogenic properties, as demonstrated above in laboratory animals, when compared with that of acetone-dried Brucella. The antigens are substantially pure glycolipoproteins which may be used to confer immunity against brucellosis infection. However, although $A_1$ displays an immunizing action, it is still somewhat endotoxic and agglutinogenic. On the other hand, as shown hereinabove, the immunizing action is still maintained in Antigen $A_{12}$ although the agglutinogenic and toxic components are absent.

The novel antigens of this invention are used in the form of sterile solutions or suspensions, as the case may be, in conventional carriers commonly used as vehicles for administration of biological products in the form of injectables. These may be, for example, distilled water, physiological saline, i.e., sodium chloride in water in a concentration of from about 0.85 to about 0.90%. Aqueous mixtures of water and benzyl alcohol may be used as partial carriers in combination with other salts commonly employed in the preparation of injectable solutions such as, for example, salts of alkali and alkali earth metals attached to an anion such as a phosphate chloride, sulfate etc., these being understandably non-toxic in nature and fully compatible with animal physiology. Obviously, the essential requirement in the preparation of injectables containing the novel antigens is to make the final preparation isotonic, although this would not be an extremely important factor when injections are used in large animals. In the case of small animals, however, this factor should be kept in mind. In this connection, it may be desirable to combine the antigen with a small quantity of local anaesthetic which is compatible with the antigenic components, such as procaine hydrochloride. The concentration of antigen in the final preparation is determined by known standardization techniques, said preparations preferably containing per dosage unit the desired therapeutically useful amount of antigen.

We have described herein techniques showing the separation of an immunogenic factor from Brucella organisms in substantially pure form, separated from the less desirable agglutinogenic and toxic components which are not factors in inducing immunity to the animal. Therefore, the degree of purity of the immunogen which is achieved when the processes of this invention are followed will reflect in a large part in the antigen concentration of the final preparation. From this, obvious standardization techniques are the necessary and finally determinative factor in the preparation of the product. Examples of useful antigenic preparations are given hereinabove by way of illustration, but without intention to limit in any way the nature of the final product with respect to concentration of the antigen.

What is claimed is:

1. A substantially non-toxic and non-agglutinogenic immunogenic substance, identified as Antigen $A_{12}$, which is useful in conferring immunity against brucellosis, in a physiologically acceptable injectable carrier, said immunogenic substance being a substantially pure glycolipoprotein characterized by the following properties: soluble in water (>1 g./100 ml.); substantially free of nucleic acids; positive responses to the Molisch reaction for carbohydrates, xanthoprotein reaction for amino acids containing aromatic structures, and biuret reaction for proteins and polypeptides; strongly positive response for lipid content; containing about 41–46% "glucose units" and chromatographically showing approximate sugar contents of about 10% galactose, about 2% glucose, about 1.5% mannose, about 1% xylose, an unidentifiable fast-running component, and a positive response for amino-sugars; optical rotation (1.14% in distilled water) of $$[\alpha]_{20}^{D}=+12(\pm 1.2^\circ)$$

an elemental analysis of about 30.5–34.5% carbon, about 5.0–5.5% hydrogen, about 2.0–4.0% nitrogen, about 1.0–2.0% phosphorus, about 4.5–6.0% sodium, about 2.0–4.0% $H_2O$ and about 6.0–8.0% volatiles; shows only a weak maximum of absorption at 258 mμ in the ultraviolet region of the spectrum, and in the infrared region exhibits no characteristic sharp bands; a sedimentation constant (1% solution in 1/15 M phosphate, pH 7.0 of $s_{20}$=1.4–1.5S; insignificant agglutination titres in rabbits at 5–80 micrograms/kg. body weight; and an $LD_{50}$ in mice >200 mg./kg. body weight.

2. In the method of extracting gram-negative bacterial organisms comprising the steps of treating said organisms with a phenol-water mixture containing 70–95 percent phenol at 1–5° C. for at least about 20–30 minutes, separating the phenolic phase from the aqueous phase, contacting said aqueous phase with a lower alkanol at temperatures of 1–5° C., and separating the resultant precipitate, the improvement which consists in the steps of so extracting Brucella organisms and, after separation of the precipitate, contacting the aqueous supernate with additional lower alkanol at temperatures of 1–5° C., thereby precipitating a substantially non-toxic and non-agglutinogenic immunogenic substance useful in conferring immunity against brucellosis.

3. The method of claim 2 wherein the Brucella organism is *Brucella abortus.*

4. The method of claim 2 wherein the Brucella organism is a mutant of *Brucella abortus.*

5. In the method of extracting gram-negative bacterial organisms comprising the steps of treating said organisms with a phenol-water mixture containing 70–95 percent phenol at 1–5° C. for at least about 20–30 minutes, separating the phenolic phase from the aqueous phase, treating the phenolic phase with additional water and again separating the phenolic phase from the aqueous phase, combining the two aqueous phases and dialyzing the combined aqueous fraction against water for a few days, concentrating the dialyzed aqueous fraction to about ⅓–½ the original volume, contacting the concentrated aqueous fraction with ethanol at temperatures of 1–5° C., and separating the resultant precipitate, the improvement which consists in the steps of using *Brucella abortus* organisms as the bacterial organism, and, after dialysis, fractionally precipitating the combined aqueous fraction without concentrating its volume by contacting said aqueous fraction with 1–4 parts by volume of ethanol at a temperature of 1–5° C., removing the resultant precipitate, and contacting the aqueous supernate with an additional 1–4 parts by volume of ethanol at a temperature of 1–5° C., thereby precipitating a substantially non-toxic and non-agglutinogenic immunogenic substance useful in conferring immunity against brucellosis.

6. The method of claim 5 wherein the bacterial organism is *Brucella abortus,* strain Schaedtbeck, MR–form.

7. The method of claim 5 wherein the bacterial organism is *Brucella abortus,* strain Shaedtbeck, MR–form.

References Cited

UNITED STATES PATENTS

Re. 24,748 12/1959 Behrens et al. -------- 167—78

OTHER REFERENCES

Braun et al.: "A Phenol-Extracted Bacterial DNA," Nature 180 (4598) pp. 1356–7, Dec. 14, 1957.

Braun et al.: "DNA-Associated Antigens of *Brucella abortus*"; in Proc., 5th Internat. Mtg. Biol. Standardization (Jerusalem), pp. 367–82 (1959).

Farthing: "The Role of Bordetella Pertussis as an Adjuvant to Antibody Production," Brit. J. Exp. Path. 42, pp. 614–622, December 1961.

Kabat et al.: "Experimental Immunochemistry," 2nd ed. (1961), published 1961 by Charles C. Thomas Co., Springfield, Ill., chapter 45, "Extraction of Antigens from Micro-Organisms," pp. 736–744, chapter 60, "Bovine-Type Antigens," pp. 830–837.

Olitzki et al.: "Active Immunization of Mice Against Experimental Brucella Infections by DNA Conjugated Proteins," in Proc., 5th Internat. Mtg. Biol. Standardization (Jerusalem), pp. 367–82 (1959).

Olitzki: "The Antigenic Relationship Between Phenol Extracted Bacterial, DNA and Other Soluble Antigens of Brucellae Studied With the Aid of the Agar Gel Precipitation Technique," Brit. J. Exp. Path. 41, pp. 623–32, December 1960.

Palczuk et al.: "Studies on DNA-ase-Sensitive Antigens of *Brucella abortus* by Complement-Fixation," Proc. Soc. Exp. Biol. Med. 107, pp. 982–6, August–September 1961.

Paterson et al.: "Protective Antigens Isolated from *Br. Abortus,*" Brit. J. Exper. Path. 28, pp. 223–236 (1947).

Philips et al.: "Antigenicity of a Bacterial DNA," Nature 181 (4608), pp. 573–575, 1958.

Plescia et al.: "Fractionation and Immunological Properties of a DNA-rich Preparation from *Brucella abortus,*" Proc. Soc. Exp. Biol. Med. 106, pp. 748–52, April 1961.

Redfearn: "An Immunochemical Study of Antigens of Brucella Extracted by the Westphal Technique," Dissertation Abstracts 21(6), 1334, December 1960.

Schneider: "Immunochemical Study of Extracts From Bruceliae," Dissertation Abstracts 21 (10), 2860, April 1961.

LEWIS GOTTS, *Primary Examiner.*

S. K. ROSE, *Assistant Examiner.*

UNITED STATES PATENT OFFICE

CERTIFICATE OF CORRECTION

Patent No. 3,342,684  
September 19, 1967

Andreas Lembke et al.

It is hereby certified that error appears in the above numbered patent requiring correction and that the said Letters Patent should read as corrected below.

Column 3, line 41, for "this" read -- This --; line 44, for "Germany" read -- West Germany --; columns 7 and 8, TABLE I, column III, in the heading, for "γ/mouse" read -- 5γ/mouse --; column 9, line 20, for ">1 g. 100 ml." read -- >1 g./100 ml. --; column 16, line 11, for "MR-form" read -- S-form --.

Signed and sealed this 22nd day of October 1968.

(SEAL)  
Attest:

Edward M. Fletcher, Jr.  
Attesting Officer

EDWARD J. BRENNER  
Commissioner of Patents